June 27, 1972　　　W. JACOB　　　3,672,737
BALL BEARING
Filed Sept. 29, 1970　　　2 Sheets-Sheet 1
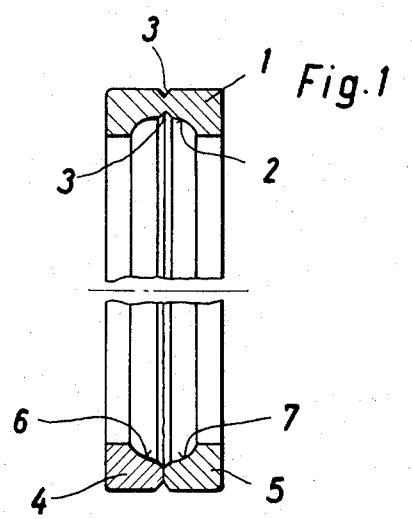
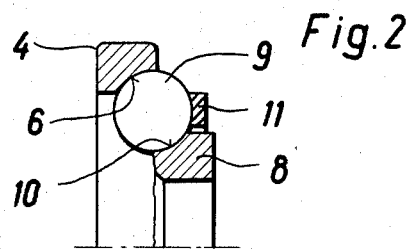
Inventor:
WERNER JACOB
BY
Hammond and Littell
ATTORNEYS June 27, 1972   W. JACOB   3,672,737
BALL BEARING
Filed Sept. 29, 1970   2 Sheets-Sheet 2
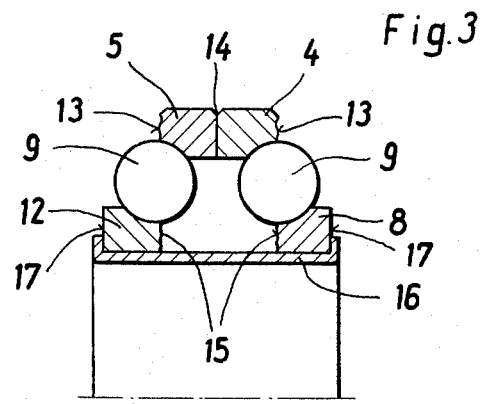
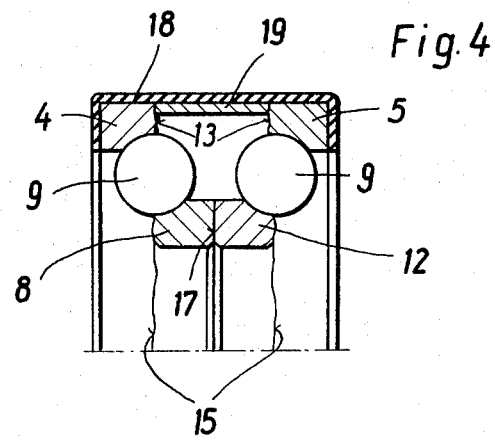
Inventor:
WERNER JACOB
BY
Hammond and Littell
ATTORNEYS

BALL BEARING

Werner Jacob, Frankfurt am Main, Germany, assignor to Industrierwerk Schaeffler OHG, Herzogenaurach, Germany
Filed Sept. 29, 1970, Ser. No. 76,570
Claims priority, application Germany, Sept. 30, 1969,
P 19 49 243.4
Int. Cl. F16c 33/60
U.S. Cl. 308—196                                    3 Claims

ABSTRACT OF THE DISCLOSURE

A process for the manufacture of race rings for inclined ball bearings and a process for the manufacture of ball bearings using such race rings.

STATE OF THE ART

In previously known inclined ball bearings, each race ring had to be produced separately and therefore a separate ball groove had to be machined in each individual race ring. This results in considerable expense for production costs and to greater tool wear because of the amount of machining required.

OBJECTS OF THE INVENTION

It is an object of the invention to provide a novel improved process for the manufacture of race rings for inclined ball bearings.

It is another object of the invention to provide novel inclined ball bearings and their production.

These and other objects and advantages of the invention will become obvious from the following detailed description.

THE INVENTION

The novel process of the invention for the production of race rings for inclined ball bearings comprises producing a race ring with a ball groove which is symmetrical to a plane lying at right angles to the bearing axis and dividing the said race ring along the plane lying at right angles to the bearing axis to form two race rings, each with a ball groove in an inclined position to the bearing axis.

The process of the invention simplifies the production of such race rings while still providing the highest degree of accuracy. Moreover, the cost of the machining step is cut in half since two race rings can be manufactured from a single machining operation.

The race rings produced by the novel process of the invention can be used in a variety of bearing assemblies and can be adapted for different uses. For a single row inclined ball bearing, the two race rings are arranged diagonally to the bearing axis. In a double row inclined ball bearing capable of being axially loaded in both directions, one pair of race rings are joined along their faces opposite to the plane of division and the other pair of race rings are spaced a distance from each other with their planes of division facing one another. In a further embodiment of the invention, the pair of race rings are held together by a connecting element whereby the race rings together with the balls form a single self-containing unit in the uninstalled state as well as where mounted.

Referring now to the drawings:

FIG. 1 is a partial cross-sectional view of a race ring embodiment of the invention.

FIG. 2 is a partial cross-sectional view of a single row inclined ball bearing of the invention.

FIGS. 3 and 4 are partial cross-sectional views of different double row inclined ball bearing embodiments.

In the outer race ring 1 illustrated in FIG. 1, a ball groove 2 is provided. To facilitate the division of outer race ring 1 which is preferably effected by splitting, a notch 3 is provided on the inner side and/or outer side of outer race ring 1 in the area of the vertical line of ball groove 2. The lower half of FIG. 1 illustrates the outer race ring 1 after division thereof to form two outer race rings 4 and 5, each provided with a ball groove 6 and 7 respectively.

In the embodiment of FIG. 2, the single row inclined ball bearing using the race rings of the invention is shown. The bearing is comprised of balls 9 situated between outer race ring 4 and inner race ring 8 and the balls are guided in ball grooves 6 and 10, respectively. The balls 9 are preferably disposed in a cage 11 and the race rings 4 and 8 are arranged diagonally to the bearing axis.

In FIG. 3, there is illustrated a double row inclined ball bearing capable of being axially loaded in both directions. The said bearing is comprised of two outer race rings 4 and 5 and two inner race rings 8 and 12 between which the two rows of balls 9 are arranged. The outer race rings 4 and 5 are joined at their faces 14 which lie opposite to the planes 13 along which they were divided while inner race rings 8 and 13 are arranged at a distance from each other with the planes 15 of division facing one another. In the illustrated embodiment, inner race rings 8 and 12 are held in place by an annular connecting element 16 which embraces radially exterior faces 17 of inner race rings 8 and 12.

In FIG. 4, a second embodiment of a double row inclined ball bearing is shown in which the outer race rings 4 and 5 are arranged at a distance from one another with their planes 13 of division facing each other while inner race rings 8 and 12 are joined at their faces 17 that lie opposite to planes 15 of division. The outer race rings 4 and 5 can be connected by a plastic element 18 which can be produced by injection molding for example and the space between outer race rings 4 and 5 is guaranteed by spacing element 19.

Various modifications of the process and the bearings of the invention may be made without departing from the spirit or scope thereof and it is to be understood that the invention is to be limited only as defined in the appended claims.

I claim:

1. A single row inclined ball bearing comprising a row of balls situated in ball grooves in an outer race ring and an inner race ring arranged diagonally to the bearing axis, each of said inner and outer race rings being produced by splitting along a plane a race ring provided with a ball groove which is symmetrical to the said plane lying at right angles to the bearing axis.

2. A double row inclined ball bearing comprising two rows of balls disposed between a pair of outer race rings and a pair of inner race rings, the said inner and outer pairs each being produced by splitting along a plane a race ring provided with a ball groove which is symmetrical to the said plane lying at right angles to the bearing axis, one pair of said race rings being joined at their faces which lie opposite to the planes of division and the other pair of race rings being arranged at a distance from one another with their planes of division facing each other.

3. A bearing of claim 2 wherein at least one pair of race rings is held together by a connecting element.

References Cited

UNITED STATES PATENTS

| 827,865 | 8/1906 | Harris et al. | 308—196 |
| 1,262,681 | 4/1918 | Laycock | 29—148.4 A |
| 3,405,434 | 10/1968 | Hoffman et al. | 29—148.4 A |

MARTIN P. SCHWADRON, Primary Examiner

F. SUSKO, Assistant Examiner